United States Patent
Zhitnitsky

(10) Patent No.: US 9,094,098 B2
(45) Date of Patent: Jul. 28, 2015

(54) MULTI-BAND RADIO FREQUENCY (RF) COMMUNICATION DEVICE USING A SINGLE ANTENNA

(75) Inventor: Gene E. Zhitnitsky, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 1613 days.

(21) Appl. No.: 12/030,066

(22) Filed: Feb. 12, 2008

(65) Prior Publication Data

US 2009/0203396 A1 Aug. 13, 2009

(51) Int. Cl.
*H04M 1/00* (2006.01)
*H04B 1/38* (2015.01)
*G01S 19/36* (2010.01)
*H04B 1/00* (2006.01)

(52) U.S. Cl.
CPC . *H04B 1/38* (2013.01); *G01S 19/36* (2013.01); *H04B 1/0057* (2013.01); *H04M 2250/10* (2013.01)

(58) Field of Classification Search
USPC ................... 455/550.1, 552.1, 553.1
See application file for complete search history.

(56) References Cited

U.S. PATENT DOCUMENTS

| | | | |
|---|---|---|---|
| 6,745,046 | B1 | 6/2004 | Eckert et al. |
| 6,912,406 | B2 | 6/2005 | Lahlum et al. |
| 6,990,357 | B2 | 1/2006 | Ella et al. |
| 2006/0067254 | A1* | 3/2006 | Mahbub et al. ............... 370/282 |
| 2006/0084469 | A1 | 4/2006 | Malone et al. |
| 2006/0135210 | A1* | 6/2006 | Frank .......................... 455/562.1 |
| 2006/0199549 | A1* | 9/2006 | Lee et al. ........................ 455/82 |
| 2006/0234658 | A1* | 10/2006 | Sue et al. ....................... 455/133 |
| 2007/0030095 | A1 | 2/2007 | Hikita et al. |
| 2007/0049295 | A1 | 3/2007 | Soliman et al. |
| 2007/0066245 | A1 | 3/2007 | Snider |

FOREIGN PATENT DOCUMENTS

| | | |
|---|---|---|
| JP | 2004-320309 | 11/2004 |
| JP | 2005-354407 | 12/2005 |

OTHER PUBLICATIONS

Faulkner, M., Adaptive duplexer for multiband transreceiver, IEEE Radio and Wireless Conference, Aug. 10-13, 2003.
Hikita et al., Investigation of SAW W-CDMA antenna duplexer and GSM-based FEM including duplexer, IEEE Ultrasonics Symposium, Aug. 23-27, 2004.
Hikita et al., Multi-band SAW front-end module considering impedance matching between FEM and direct-conversion RF-IC, IEEE Ultrasonics Symposium, Oct. 8-11, 2002.
Hikita et al., SAW front-end module for GSM-based dual-band cellular phones with direct-conversion demodulation, IEEE Microwave Theory and Techniques, Nov. 2002.

\* cited by examiner

*Primary Examiner* — Fayyaz Alam

(57) ABSTRACT

A GPS-enabled, multi-band wireless communication device (WCD) uses a single antenna for receiving global positioning system (GPS) signals and for transmitting and receiving radio frequency (RF) signals in plural RF communication bands. The RF communication bands can include the Advanced Wireless Services (AWS) band, cellular band and Personal Communication Service (PCS) band. To achieve single antenna convergence, the WCD includes an n-plexer, an RF bypass path and an RF switch. The n-plexer is coupled to a GPS receive path and to transmit and receive paths for a first RF communication band. The bypass path bypasses the n-plexer and carries a second RF communication band. A switch selectively couples the antenna to either the n-plexer or the bypass path, depending on which RF communication band is being used.

7 Claims, 6 Drawing Sheets

US 9,094,098 B2

MULTI-BAND RADIO FREQUENCY (RF) COMMUNICATION DEVICE USING A SINGLE ANTENNA

FIELD OF THE INVENTION

The invention relates generally to wireless communications systems, and more specifically, to GPS-enabled, multi-band wireless communication devices.

BACKGROUND

Commercial wireless communication services such as cellular phone services and wireless data services are available on an increasing number of radio frequency (RF) bands. In the United States, for example, cellular and data services are currently available on the cellular band or Advanced Mobile Phone System (AMPS) band and the Personal Communication Service (PCS) band. In addition, the Advanced Wireless Services (AWS) band has also recently become available for providing commercial wireless services.

To more fully utilize multiple RF bands and enhance the value of a portable wireless device, it is desirable to have a portable, multi-band wireless device that is capable of transmitting and receiving signals on different RF bands. A multi-band wireless device represents an integration of various wireless technologies into a single portable device so that the device can use different RF bands. A dual-band cellular phone capable of using the analog AMPS band and digital PCS band is a common example of a multi-band portable device. As more commercial RF bands become available for portable devices, it is desirable to have portable devices that can take advantage of these additional bands. Accommodating these additional RF bands in a portable wireless device requires innovative approaches to antenna and RF circuitry design in the device.

In addition, in some multi-band wireless devices, it is also desirable to integrate a Global Positioning System (GPS) function. A hand-held GPS device provides positional information, related to the location of the GPS device, by receiving and processing GPS band signals from the GPS satellite system. Although such positional information can be quite useful, it is not always convenient to carry a separate GPS device, especially if a user also carries around one or more other portable wireless devices, such as a laptop, cellular phone, Personal Digital Assistant (PDA), or other similar device. It is therefore desirable that the GPS positioning function be integrated within one of these other portable devices.

Unfortunately, known approaches for integrating certain wireless and GPS technologies into a portable, multi-band device have proven to be relatively difficult and costly in terms of added components, power consumption, and physical size. Much of difficulty arises in the design of the antennas and RF circuitry in the portable device. Some conventional design approaches to integrated multi-band devices involve putting multiple antennas into the portable device to handle the different RF bands and GPS band. However, multiple antennas add extra cost and design complexity to the device. Thus, there is a need for a better solution to integrating multiple RF bands and GPS functionality into portable wireless devices.

SUMMARY

Disclosed herein is a wireless communication device (WCD) that uses a single antenna for reception of the GPS band and reception and transmission on plural RF communication bands. Significant cost, power and space savings are achieved by using only one antenna in the WCD.

An exemplary GPS-enabled, multi-band WCD uses a single antenna for receiving GPS signals and for transmitting and receiving RF signals in the AWS band, cellular band and PCS band. To achieve single antenna convergence, the WCD includes an n-plexer, an RF bypass path and an RF switch. The n-plexer is coupled to a GPS receive path and to transmit and receive paths for a first RF communication band. The bypass path bypasses the n-plexer and carries signals in a second RF communication band. A switch selectively couples the antenna to either the n-plexer or the bypass path, depending on which RF communication band is being used.

In an alternative exemplary configuration of the WCD, the switch can simultaneously couple the n-plexer and bypass path to the antenna.

Other aspects, features, advantages of the single antenna configuration will be or will become apparent to one with skill in the art upon examination of the following figures and detailed description. It is intended that all such additional features, and advantages be included within this description and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Figure 1:
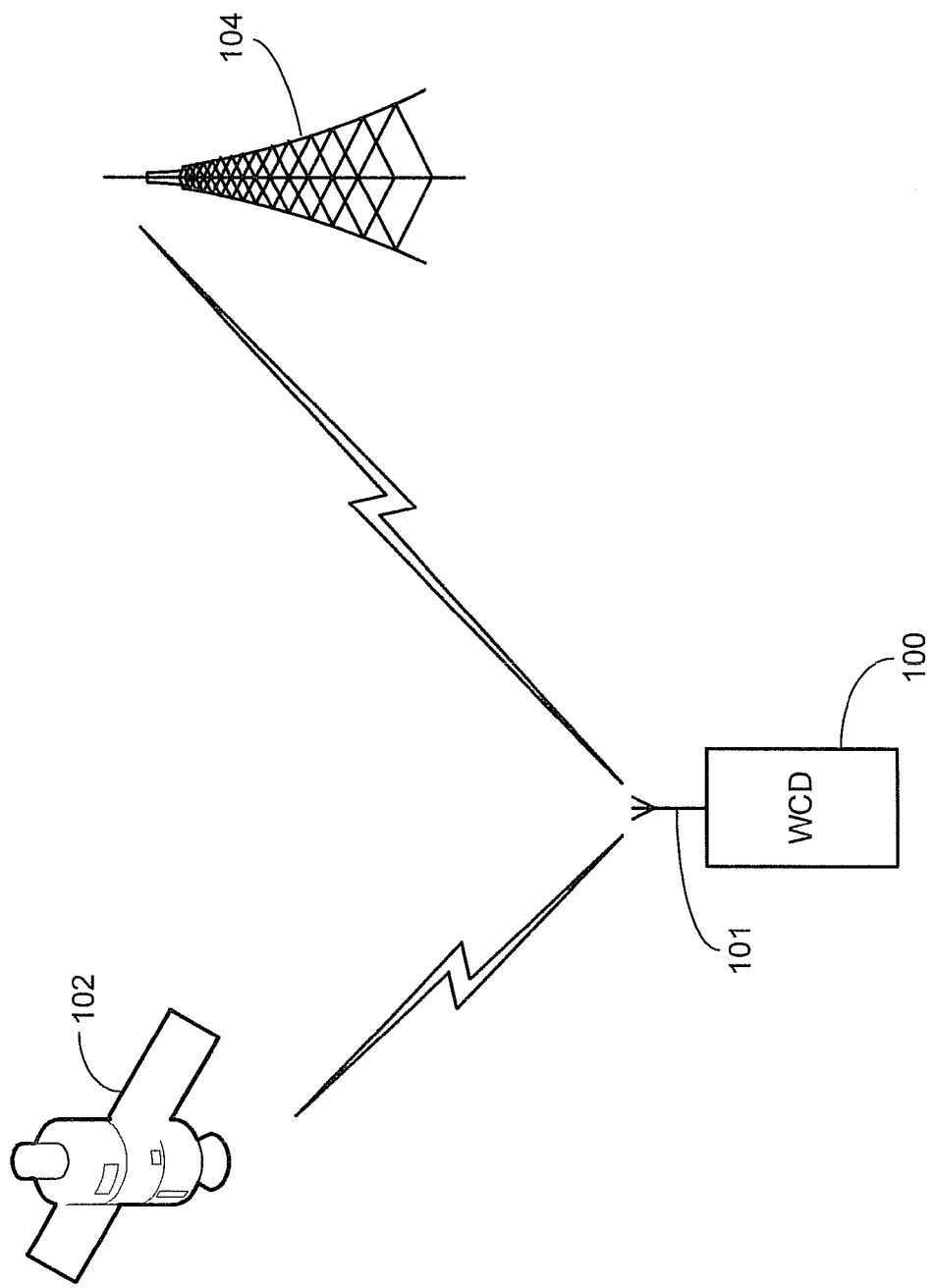
FIG. 1 shows a representation illustrating an exemplary embodiment of a wireless communications system in accordance with the present invention.

FIG. 1 illustrates a wireless communications system 103 including a wireless communication device (WCD) 100, a Global Positioning System (GPS) satellite 102 and a based station 104, in accordance with an exemplary embodiment of the present invention. The WCD 100 can, for example, be a wireless handset, a car phone, a cordless phone, a laptop computer or other computing device with a wireless modem, a pager, or a personal digit assistant (PDA) with wireless communication capability. Further, the WCD 100 can use digital or analog technology or some combination thereof. Thus, the following descriptions should not be seen as limiting the devices and methods described herein to any particular type of wireless communication device.

The WCD 100 is a wireless handset having an antenna 101. Both the WCD 100 and antenna 101 are adapted to receive and transmit wireless communication signals in at least two different communication bands. The bands preferably include, for example, the cellular band or Advanced Mobile Phone System (AMPS) band, which has bandwidth at 824-894 MHz; the Personal Communication Service (PCS) band, which has a bandwidth at 1850-1990 MHz; and the Advanced Wireless Services (AWS) band, which has bandwidths at 1710-1755 and 2101-2155 MHz. In addition, the WCD 100 and antenna 101 are configured to receive GPS signals at approximately 1575 MHz.

It will be appreciated that more or fewer communication bands, or different bands, can be accommodated by appropriate selection of antenna(s) and associated circuitry. For example, the WCD 100 can be constructed to use only the PCS and AWS bands, or it can be constructed to receive and transmit signals on additional communication bands, beyond the cellular, PCS, AWS and GPS bands, or on different bands, such as those used outside of North America.

The antenna 101 is structured to transmit and receive wireless communication signals in multiple RF bands, e.g., the AWS, PCS and cellular bands, and to receive GPS signals. The antenna 101 is configured to robustly receive position location signals, such as a GPS signal from satellite 102.

In the example of FIG. 1, the antenna 101 is in two-way communications with a base station 104. The base station 104 can, for example, be one of a plurality of base stations 104 in a wireless communications network. The antenna 101 is also in at least one-way communication with one or more GPS satellites, such as GPS satellite 102. The GPS satellite 102 can, for example, be one of a plurality of GPS satellites in a constellation of GPS satellites.

Figure 2:
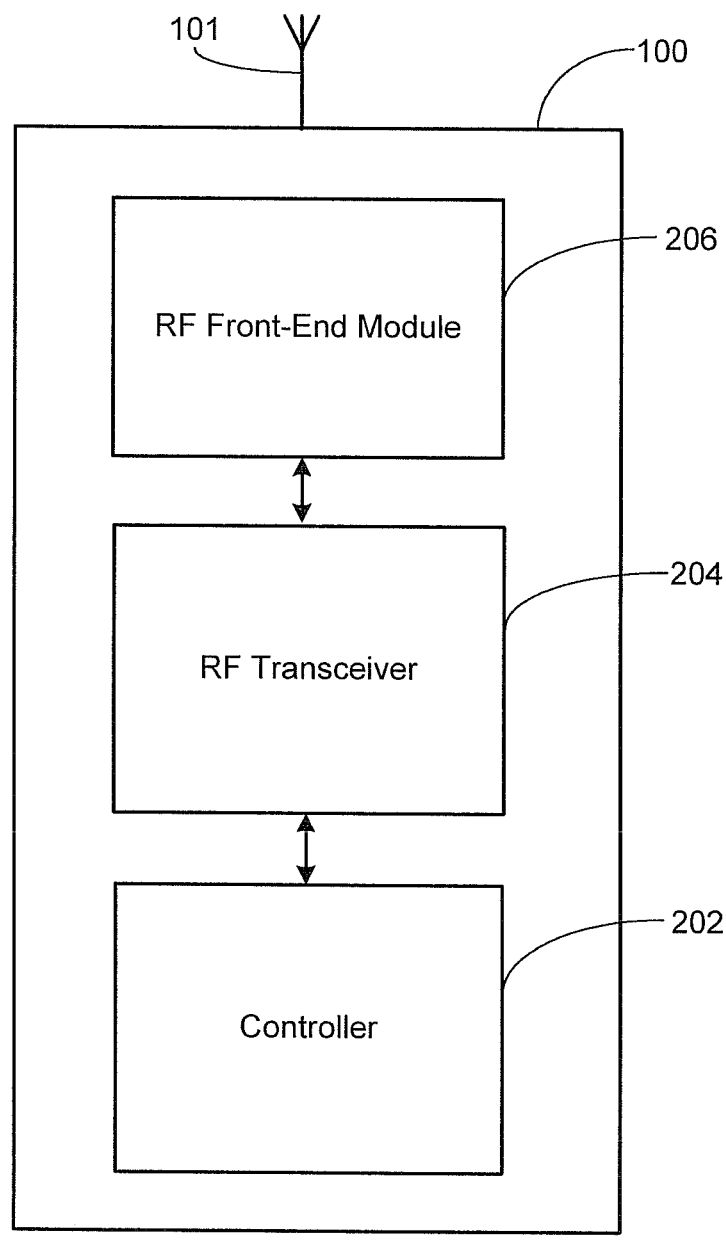
FIG. 2 is a block diagram showing selected components of the wireless communication device shown in FIG. 1.

FIG. 2 is a block diagram showing selected components of the WCD 100 shown in FIG. 1. The WCD 100 includes either of the multi-band RF front-end circuits 300, 400 shown in FIGS. 3 and 4.

The WCD 100 includes the antenna 101, a controller 202 having a processor and memory (not shown), an air interface including a radio frequency (RF) transceiver 204 having a transmitter and a receiver (not shown), and an RF front-end module 206.

The controller 202 is the main controller of the WCD 100 and controls the user interface of the WCD 100 and the overall operation of the WCD 100, including operation of the RF transceiver 204 and RF front-end module 206. The controller 202 also performs, among other things, baseband processing on digitized communication signals. The controller memory stores one or more software programs executed by the controller 202 to perform its functions.

The RF transceiver 204 includes one or more RF transmitters and receivers configured to the communications bands on which the WCD operates. The RF transceiver 204 also includes a GPS receiver. The RF transceiver 204 passes communication and GPS signals between the controller 202 and RF front-end module 206.

The RF front-end module 206 is coupled to the antenna 101 and the RF transceiver 204, and may also receive control signals directly from the controller 202. The RF front-end module 206 generally provides amplification, filtering, phase shifting and impedance matching for RF signals that are transmitted or received by the WCD 100. Selected portions of RF circuitry that can be included in the RF front-end module 206 are discussed below in connection with FIGS. 3 and 4.

The controller 202, RF transceiver 204 and some components of the RF front-end module 206 (e.g., low noise receiver amplifiers) can be integrated into a single chip, such as a mobile station modem (MSM). Alternatively, the controller 202, RF transceiver 204 and RF front-end module 206 can be implemented using any suitable combination of components, including analog and digital components, such as one or more digital signal processors (DSPs), microprocessors, standard components, passive components, active components, application specific integrated circuits (ASICs), or the like.

Figure 3:
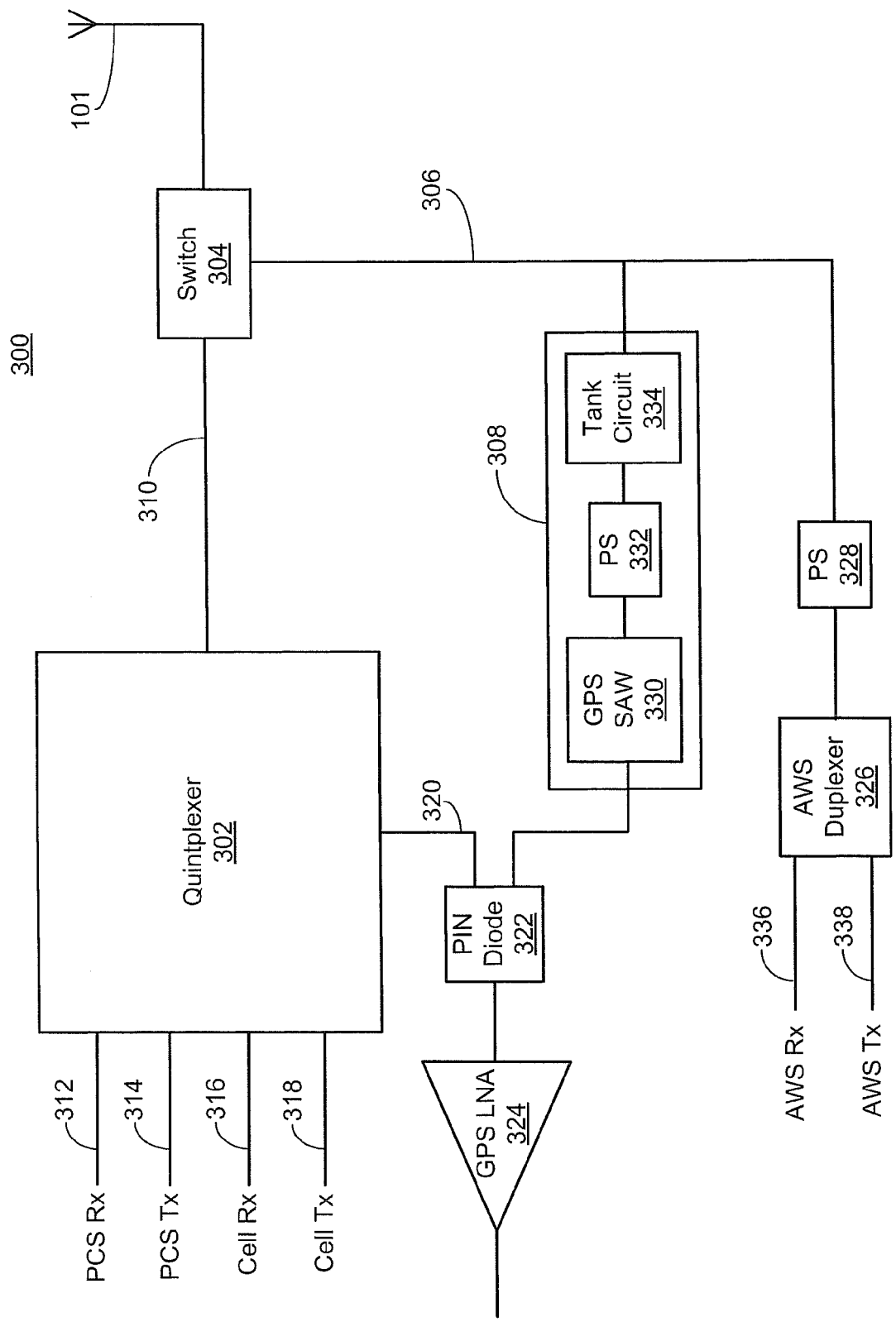
FIG. 3 is a diagram illustrating selected components of an RF front-end circuit that can be included in the RF front-end module shown in FIG. 2.

FIG. 3 is a diagram illustrating selected components of a first RF front-end circuit 300 that can be included in the WCD 100 of FIGS. 1 and 2. The circuit 300 includes an n-plexer, specifically a quintplexer 302, an RF bypass path 306 and a switch 304 for selectively coupling either the quintplexer 302 or the RF bypass path 306 to the antenna 101. Coupled to the RF bypass path 306 is a filter circuit 308, a phase shift (PS) circuit 328, and AWS duplexer 326.

An n-plexer is a device that combines RF duplexer(s) and/or triplexer functions into a single component for multiple RF bands. An n-plexer can also be configured to include filtering functions, such as bandpass filtering, for the RF bands. The RF bands can include both communications and GPS bands. Combining such functionality into a single component reduces the component count and physical size of an RF front-end circuit. The n-plexer has n ports, where n represents the number of port. Thus, in the examples shown in FIGS. 3 and 4, the quintplexer 302 has five ports. An n-plexer having more or fewer ports can be used in different configurations of the WCD 100.

The quintplexer 302 has a PCS receive (Rx) port coupled to a PCS Rx path 312, a PCS transmit (Tx) port coupled to a PCS Tx path 314, a cellular receive (Cell Rx) port coupled to a cellular Rx path 316, a cellular transmit (Cell Tx) port coupled to a cellular Tx path 318. The quintplexer 302 also has a GPS port coupled to a GPS receive path 320.

The quintplexer 302 can be a commercially-available part, such as part no. ACFM-7102 from Avago Technologies, Limited.

The filter circuit 308 includes a GPS surface acoustic wave (SAW) filter coupled to a PS circuit 332, which is coupled to a tank circuit 334. The input of the tank circuit 334 is coupled to the RF bypass path 306 and the output of the GPS SAW filter 330 is coupled to the input of a PIN diode (Positive Intrinsic Negative diode) 322. The GPS SAW filter 330 is preferably a commercially-available SAW filter suitably configured to bandpass filter the GPS band signals. The PS circuit 332 matches the phase of the incoming GPS signals on the RF bypass path 306 to the phase required for further processing of the GPS signals within the WCD 100.

The tank circuit 334 and PS circuit 332 are configured to create a virtual open circuit at the AWS band frequencies. This reduces the load on the RF bypass path 306 in the AWS band frequencies, and thus, improves the performance of the RF front-end circuit 300 at AWS band frequencies.

The input of the PIN diode 322 is also coupled to the GPS Rx path 320, and the output of the PIN diode 322 is coupled to a GPS low noise amplifier (LNA) 324. The PIN diode 322 acts as an RF switch and is under control of the controller 202. In place of the PIN diode 322, a GaAs switch or any other suitable RF switch can be used.

The circuit 300 is a simultaneous GPS (s-GPS) system. This means that the GPS location signals are available in the WCD 100 when any RF communication band is chosen.

Switch 304 is controlled by the controller 202 of WCD 100. The switch 304 is preferably a single-pole double-throw (SPDT) RF switch that selectively switches between the AWS band (via the RF bypass path 206) and the PCS or cellular bands (via a quintplexer path 310), depending which RF band the WCD 100 is operating on. Irrespective of the selected RF communication band, the RF circuit 300 allows simultaneous reception of the GPS band. When the WCD 100 is operating on the AWS band, the switch 304 couples the RF bypass path 306 to the antenna 101. When the WCD 100 is operating on either the PCS or cellular band, the switch 304 couples the quintplexer path 310 to the antenna 101. GPS signals are received at the PIN diode 322 through either the quintplexer 302 or the RF bypass path 306 via the filter circuit 308.

The switch 304 is preferably an off-the-shelf component, and can be a GaAs switch or any other suitable RF switch.

The AWS duplexer 326 is preferably a commercially-available duplexer configured to duplex the AWS Rx and Tx paths 336, 338. The AWS PS circuit 328 matches the phase and impedance of the AWS and GPS signals on the RF bypass path 306 required for further processing of the AWS and GPS signals within the WCD 100.

The cellular, PCS, AWS Rx and Tx paths 312-318, 336-338, the RF bypass path 306 and the GPS Rx path 320 are conductors, preferably circuit board tracks, configured to carry, respectively, corresponding RF communication band signals and GPS signals.

Figure 4:
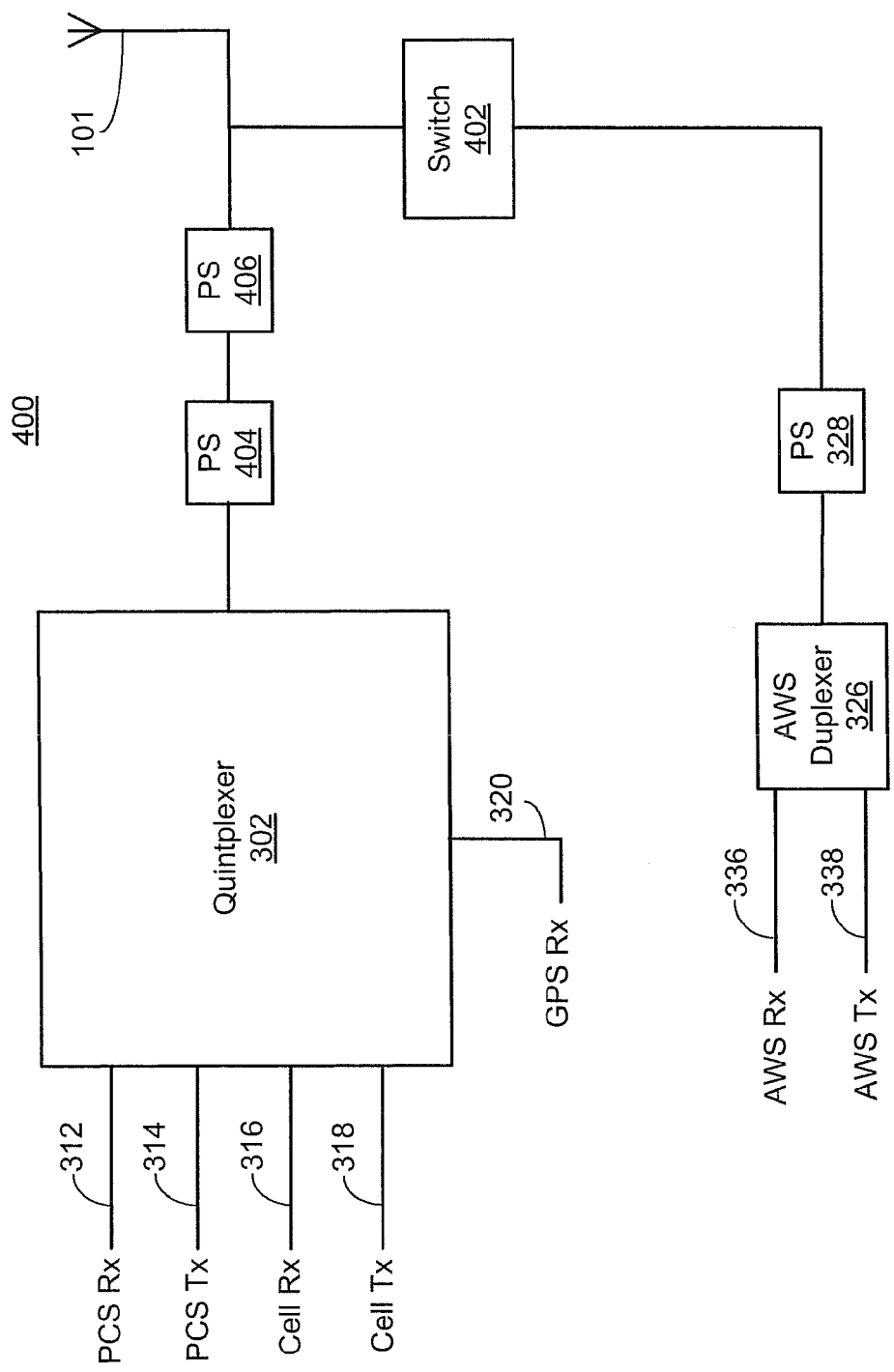
FIG. 4 is a diagram illustrating selected components of an alternative RF front-end circuit that can be included in the in the RF front-end module shown in FIG. 2.

FIG. 4 is a diagram illustrating selected components of a second RF front-end circuit 400 that can be alternatively included in the wireless communication device of FIGS. 1 and 2. In contrast to the first RF front-end circuit 300 shown in FIG. 3, the RF front-end circuit 400 of FIG. 4 is configured so that the switch 402 can simultaneously couple the GPS band through the quintplexer 302 regardless of the switch 402 position.

The circuit 400 includes the quintplexer 302, the RF bypass path 306 and a two-way switch 402 for selectively coupling the RF bypass path 306 to the antenna 101. The AWS duplexer 326 is coupled to the RF bypass path 306.

AWS phase shifting (PS) circuits 404 and 406 are coupled between the antenna 101 and quintplexer 302. These PS circuits 404, 406 perform required phase matching for the AWS band signals. The GPS phase shifting (PS) circuit 328 is coupled between the AWS duplexer 326 and switch 402. The PS circuit 328 performs phase matching for the GPS band signal when the switch 402 is in AWS mode position.

The circuit 400 is a simultaneous GPS (s-GPS) system. Thus, the GPS location signals are available in the WCD 100 when any RF communication band is chosen.

Figure 5:
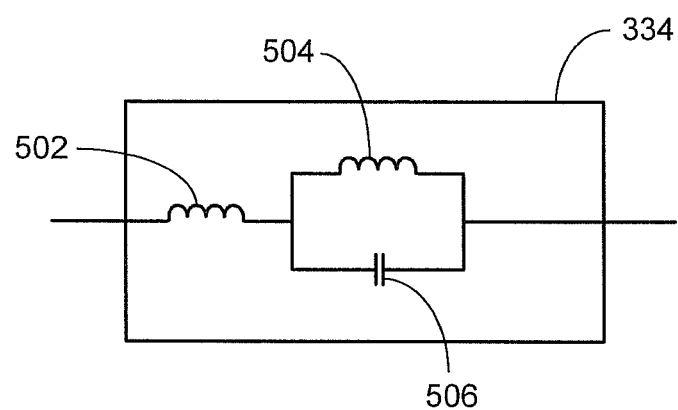
FIG. 5 illustrates an exemplary tank circuit that can be included in the RF front-end module shown in FIG. 3.

FIG. 5 illustrates an exemplary tank circuit 334 that can be included in the RF front-end module 300 shown in FIG. 3. The tank circuit 334 includes a first inductor 502 in series with the parallel combination of a second inductor 504 and capacitor 506.

Those of ordinary skill in the art will readily appreciate that additional or alternative phase matching circuits for RF signals may be included in the exemplary RF front-end circuits 300, 400. In addition, impedance matching circuits (not shown) may also be incorporated in the RF front-end circuits 300, 400.

Figure 6:
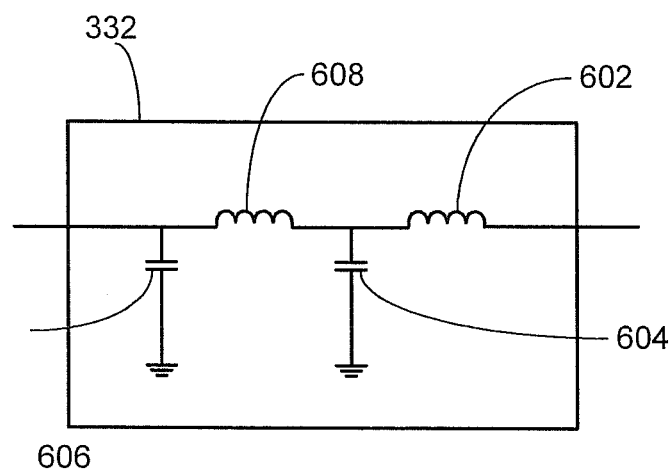
FIG. 6 illustrates an exemplary phase shift circuit that can be included in the RF front-end modules shown in FIGS. 3 and 4.

FIG. 6 illustrates an exemplary PS circuit 332 that can be included in the RF front-end module 300 shown in FIG. 3. It will be appreciated by those of ordinary skill in the art that the PS circuits 328, 332, 404, 406 and impedance matching circuits or other matching circuitry can be implemented using a wide variety of circuit topologies and components. The PS circuits 328, 332, 404, 406 can include active devices, such as GaAs switches, and/or passive components, i.e., inductors, capacitors and/or resistors, connected in known configurations such as tee and/or pi networks. Such phase and impedance matching circuits are well known in the art.

FIG. 6 illustrates one such configuration of the PS matching circuit 332. This configuration can also be used for the other PS circuits 328, 404, 406. In FIG. 6, an input to the PS circuit 332 is coupled to a first inductor 602. The first inductor 602 is coupled to the output of the PS circuit 332 via a second inductor 608. The first inductor 602 is also coupled to a voltage potential, e.g., electrical or chassis ground, via a first capacitor 604. The second inductor 608 forms a pi-network with the first capacitor 604 and a second capacitor 606.

Figure 7:
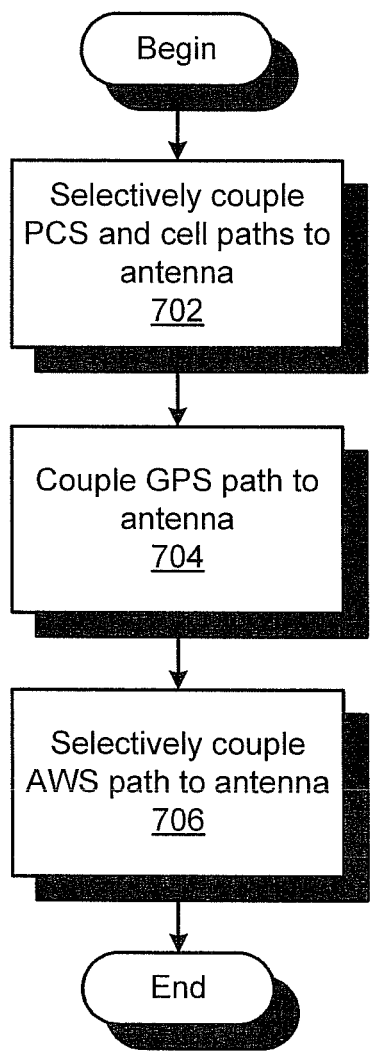
FIG. 7 is a flowchart illustrating a method of sharing a single antenna among multiple RF communication bands and a GPS receiver.

FIG. 7 is a flowchart 700 illustrating a method of sharing the single antenna 101 among multiple RF communication bands and a GPS receiver in the WCD 100 using either of the RF front-end circuits 300, 400. In step 702, PCS and cellular Tx and Rx paths 312-318 are selectively coupled to the antenna 101 using the switches 304 or 402. In one position, the switches 304, 402 pass PCS and cellular signals, in their other position, the switches 304, 402 pass AWS signals.

In step 704, the GPS Rx path 320 is continuously coupled to the antenna 101 so that the GPS signals can be received simultaneously with any of the other RF bands. In the RF front-end circuits 300, 400, the GPS path 320 is at all times coupled to the antenna 101, irrespective of the switch 304, 402 position.

In step 706, the switch 304, 402 position is changed and the RF bypass path 306 is coupled to the antenna 101, instead of the cellular and PCS paths 312-318. The RF bypass path 306 bypasses the quintplexer 302 and is configured to effectively pass signals in the AWS band in both the first and second RF front-end circuits 300, 400.

Other embodiments and modifications will readily occur to those of ordinary skill in the art in view of these teachings. The above description is illustrative and not restrictive. The invention is to be limited only by the following claims, which are intended to cover those other embodiments and modifications, as well as those disclosed herein, when viewed in conjunction with the above specification and accompanying drawings. The scope of the invention is defined by the appended claims along with their full scope of equivalents.

What is claimed is:

1. A wireless communication device, comprising:
   a single antenna;
   a global positioning system (GPS) receive path coupled to the single antenna;
   a radio frequency (RF) transmit path coupled to the single antenna and configured to transmit transmission signals in an RF communication band while GPS location signals are received through the single antenna; and
   a radio frequency (RF) receive path coupled to the single antenna and configured to receive reception signals in the RF communication band while GPS location signals are received through the single antenna.

2. The wireless communication device of claim 1, wherein the RF communication band is a Personal Communication Service (PCS) band.

3. The wireless communication device of claim 1, wherein the RF communication band is an Advanced Wireless Services (AWS) band.

4. The wireless communication device of claim 1, wherein the RF communication band is a cellular band.

5. The wireless communication device of claim 2, further comprising:
- another radio frequency (RF) transmit path coupled to the single antenna and configured to transmit transmission signals in another RF communication band while GPS location signals are received through the single antenna; and
- another radio frequency (RF) receive path coupled to the single antenna and configured to receive reception signals in the another RF communication band while GPS location signals are received through the single antenna.

6. The wireless communication device of claim 5, wherein the RF communication band is selected from the group consisting of a Personal Communication Service (PCS) band and a cellular band.

7. The wireless communication device of claim 6, wherein the another RF communication band is an Advanced Wireless Services (AWS) band.

* * * * *